US005266757A

United States Patent [19]

Krapek et al.

[11] Patent Number: 5,266,757

[45] Date of Patent: Nov. 30, 1993

[54] ELEVATOR MOTION PROFILE SELECTION

[75] Inventors: Karl J. Krapek; Joseph Bittar, both of Avon, Conn.

[73] Assignee: Otis Elevator Company, Farmington, Conn.

[21] Appl. No.: 17,345

[22] Filed: Feb. 10, 1993

Related U.S. Application Data

[63] Continuation of Ser. No. 583,924, Sep. 17, 1990, abandoned.

[51] Int. Cl.[5] .......... B60B 1/24

[52] U.S. Cl. .......... 187/116; 187/118

[58] Field of Search .......... 187/101, 118, 125, 122, 187/116

[56] References Cited

U.S. PATENT DOCUMENTS

| | | | |
|---|---|---|---|
| 3,891,064 | 6/1975 | Clark | 187/118 |
| 4,155,426 | 5/1979 | Booker | 187/118 |
| 4,193,478 | 3/1980 | Keller et al. | 187/101 |
| 4,527,662 | 7/1985 | Doane et al. | 187/116 |
| 4,658,935 | 4/1987 | Holland | 187/122 |
| 4,751,984 | 6/1988 | Williams et al. | 187/116 |

OTHER PUBLICATIONS

G. C. Barney and S. M. dos Santos "Lift Traffic Analysis Design & Control" Pub. by Peter Peregrinus Ltd. Southgate House, Stevenage, Herts. SG1 1HQ England (1977).

*Primary Examiner*—Steven L. Stephan
*Assistant Examiner*—Robert Nappi
*Attorney, Agent, or Firm*—Robert P. Hayter

[57] ABSTRACT

An elevator system including a variable speed motive means is disclosed wherein the motive means is controlled in response to a selected motion profile to effect desired operation of the elevator car. Multiple elevator car motion profiles are stored and a appropriate profile is selected to operate the elevator car such that the level of service necessary to meet demand is provided while operating the elevator cars at reduced acceleration and jerk rates to provide increased ride comfort. Appropriate motion profiles are selected based on factors such as demand for elevator service and whether the building is in an up-peak or down-peak traffic period.

3 Claims, 3 Drawing Sheets

FASTEST PROFILE

INTERMEDIATE PROFILE

SLOWEST PROFILE

ELEVATOR MOTION PROFILE SELECTION

This is a continuation of application Ser. No. 07/583,924, filed Sep. 17, 1990, now abandoned.

RELATED APPLICATIONS

This application relates to co-pending application Ser. No. 07/583,931 entitled "Elevator Profile Selection Based on Absence or Presence of Passengers" filed concurrently herewith and owned by the Assignee hereof, co-pending application Ser. No. 07/508,319 entitled "Elevator System With Varying Motion Profiles and Parameters Based on Crowd-Related Predictions" owned by the Assignee hereof and co-pending application Ser. No. 07/508,322 entitled "Automatic Selection of Different Motion Profile Parameters Based on Average Waiting Time" also owned by the Assignee hereof.

BACKGROUND OF THE INVENTION

The use of a velocity profile to control the motion of an elevator car is well known. See, for instance, U.S. Pat. No. 4,751,984 entitled "Dynamically Generated Adaptive Elevator Velocity Profile", as well as pending U.S. Patent Application Ser. No. 07/375,429 entitled "Elevator Speed Dictation System", both of which are owned by the Assignee hereof and both of which disclose how to generate velocity or motion profiles for an elevator car.

Motion control of an elevator car involves regulating the movement of an elevator car from an origin floor to a destination floor. Car motion may be controlled by using jerk rates, acceleration rates and deceleration rates to regulate the rate of change of acceleration and velocity to maintain the forces acting on a passenger within the car within a subjective comfort zone. A typical motion profile also includes a maximum desired speed which the elevator car will attain during longer floor runs, also known as the contract speed. A feedback loop is used to regulate the car motion especially as the car decelerates to a stop as it approaches the destination floor.

On short runs elevator cars usually do not achieve their desired maximum speed. On longer runs an elevator car travels at maximum speed after it is accelerated to that speed once it leaves the origin floor and it continues at maximum speed until it must decelerate to stop at the destination floor. For both short runs and longer runs the overall flight time, the time period extending from when the elevator doors are closed at the origin floor until the doors open at the destination floor, may be reduced if the elevator car accelerates and decelerates faster either allowing the car to reach a higher speed on a short run or to operate for longer periods at maximum speed in a longer run. By reducing the flight time between floors, the waiting time for passengers awaiting arrival of an elevator car is reduced, the travel time for passengers in the elevator car is reduced, and the overall capacity of the elevator system to move people is increased.

During periods of reduced traffic, the jerk, acceleration and deceleration rates may be reduced increasing the flight time between floors enhancing the smoothness of the ride and the comfort level of the elevator car passenger without increasing the waiting time for passengers awaiting an elevator car beyond a desired level and while maintaining sufficient elevator system capacity to serve all the passengers.

Previously, the designers of elevator systems have preselected a particular motion profile for each elevator system. This motion profile would represent a compromise between fast flight times and increased capacity as opposed to slow flight time and increased comfort. The profile selected for each elevator might even vary based upon the particular market where the elevator would be installed and the expectations of passengers on a desired comfort level and the need for faster service. For instance, Far Eastern passengers prefer a motion profile with relatively slow jerk and acceleration rates such that a smoother, more comfortable ride is obtained and are more willing to wait longer for the elevator car to arrive than other passengers. The typical North American passenger has been less concerned with comfort and is more concerned with fast flight times and decreased waiting time and, therefore, would prefer to have the elevator car operated at a faster profile with slightly less passenger comfort due to the higher acceleration and jerk rates.

SUMMARY OF THE INVENTION

The present invention minimizes the problem of making compromises between comfort and performance in preselecting a particular motion profile by providing for the selection of varying profiles allowing passenger comfort to be maximized while maintaining a sufficient elevator system capacity to serve all passengers.

Selection of a motion profile may be based on programmed inputs, up-peak or down-peak traffic levels or a factor based on traffic intensity, such as average registration time. During those periods when there is additional need for elevator service, faster motion profiles (motion profiles with higher acceleration, jerk and deceleration rates) are used reducing flight times between floors. During periods when the demand for elevator service is reduced, slower motion profiles (motion profiles with lower acceleration, jerk and deceleration rates) are selected which continue to achieve a desired level of elevator service while providing for an increased comfort ride.

The present invention concerns an elevator system having a variable speed motive means for displacing an elevator car between floors in a building in accordance with a motion profile. In order to provide increased passenger comfort while maintaining sufficient elevator capacity to service the elevator needs of a building, a selection is made between varying motion profiles. The slowest motion profile which maintains sufficient elevator service for the building is usually selected. A different profile is selected when detection of a preemptory event, such as, operator override, an override scheduled for preselected time periods or the occurrence of peak periods when the building is experiencing a peak traffic pattern, such as up-peak or down-peak periods at the beginning and end of the workday in an office building.

Signal processing means may be connected to provide input signals to the control system of the elevator system to control the motion of the car. The signal processing means includes motion profile means for generating at least three elevator car motion profiles, one acting to cause the motive means to displace the car such that the travel time between floors is reduced, and another acting to cause the motive means to displace the car such that the travel time between floors is increased.

Selection means are provided for selecting which car motion profile will be used to control the motive means.

The selection of a particular motion profile may be based on the average registration time (the time period between when a hall button is pushed indicating the origin floor for the hall call button until such time as the elevator car arrives at the origin floor corresponding to the hall call.) This time is an indicator of traffic intensity. A series of ranges of a measurement indicative of traffic intensity may be stored and a corresponding motion profile selected for each range when a detected traffic intensity level falls within that range.

Upon the detection of a peak load condition, such as an office building up-peak in the morning or a down-peak at the close of business, the elevator car motion profile having the shortest flight time may be selected to increase the system capacity for the elevator. Peak load conditions may be determined by various factors, such as, two cars leaving a lobby having a preselected level of loading within a certain time period of each other, the load sensor sensing the passenger load of each elevator car, a crowd sensor indicating a crowd of people waiting for an elevator car or two cars reaching the lobby at a certain load level within a certain time period or other means including but not limited to a timed input or a manually operated switch.

Also disclosed is a control for an elevator system having a variable speed motive means for regulating the movement of an elevator car between floors of a building. The control receives input signals indicative of the passenger demand for elevator service and provides output signals to the variable speed motive means to effect the desired movement of the elevator car. Motion profile means for generating at least three motion profiles are provided, one motion profile causing the elevator car flight time to be low thereby allowing for shorter time periods for the car to travel between floors and another acting to cause the elevator car flight time to be higher allowing for a longer flight time for the car to travel between floors. Means are provided for selecting which car motion profile should be chosen to regulate elevator car movement based on meeting passenger demand while providing for the highest quality ride.

A method of regulating an elevator car as it is displaced by variable speed motive means between floors for a building is also disclosed. The method includes providing at least three elevator car motion profiles for regulating the motion of the elevator car as it travels between floors in the building, determining the passenger demand for elevator service, selecting the elevator car motion profile which will satisfy the passenger demand while operating the elevator car at a slower rate of acceleration, jerk and deceleration, and controlling the variable speed motive means to effect the desired elevator car motion in response to the elevator car motion profile chosen.

These and other objects of the present invention will become more apparent in light of the detailed description of the preferred embodiment and the accompanying drawings.

DESCRIPTION OF THE PREFERRED EMBODIMENT

Figure 1:
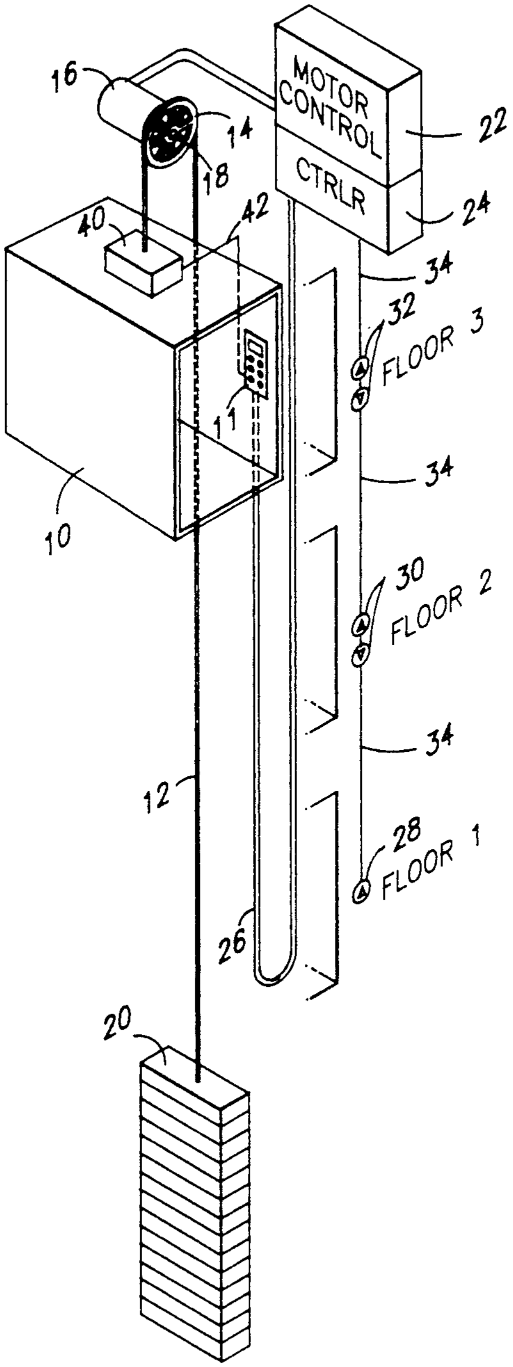
FIG. 1 PRIOR ART
FIG. 1 is a schematic representation of an elevator system.

Referring first to FIG. 1, a schematic representation of an elevator system is shown with elevator car 10 mounted within a shaftway (not shown) for vertical displacement. Elevator car 10 is connected by rope 12 over sheave 14 extending behind car 10 to counterweight 20. Motor 16 acts to control the rotation of drive shaft 18 on which sheave 14 is mounted. Operation of motor 16 effects rotation of sheave 14 thereby causing the elevator car and counterweight to be displaced in a vertical direction.

Motor control 22, sometimes referred to as the drive in the elevator industry, includes the appropriate power electronics for supplying power to the motor to cause the motor to rotate at selected acceleration, jerk and velocity levels to cause the elevator car to move or be displaced in the desired manner. Appropriate electrical characteristics of the power supplied by the motor are generated via motor control 22.

Controller 24 contains the logic signal processing means to regulate elevator system operation. A car operating panel 11 mounted within the elevator car is connected to controller 24 via travelling cable 26 extending from the elevator car to the controller. Hall call buttons 28, 30, and 32 are arranged on floors 1 through 3 and are all connected via serial link 34 to controller 24. Controller 24 typically contains a programmed microprocessor which receives data indicative of the status of the various buttons in car operating panel 11 and the hall call buttons and is capable of utilizing this information in a variety of control functions. The software necessary to operate the elevator is stored in the controller including software which may generate various velocity profiles. See U.S. Pat. No. 4,751,984 entitled "Dynamically Generated Adaptive Elevator Velocity Profile" for specific examples of how to generate such profiles.

Figure 2:
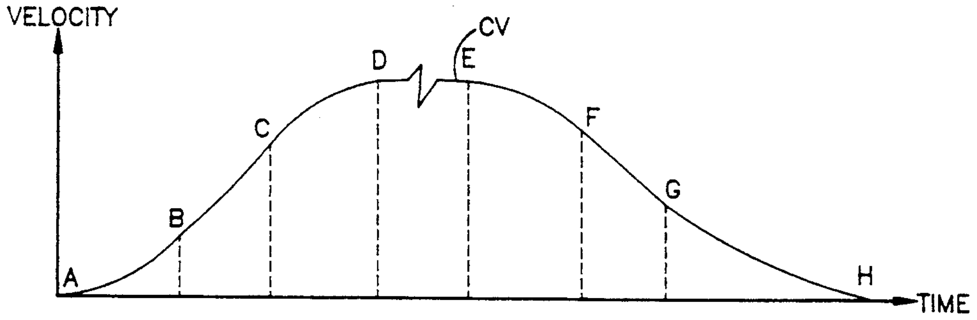
FIG. 2 is a graph of a velocity profile for the fastest exemplary profile.

FIG. 2 shows an exemplary velocity profile and is a graph with velocity plotted on the vertical access and time on the horizontal axis. This profile is chosen to depict flight of an elevator car from an origin floor to a destination floor and it is assumed that the flight is long enough that the elevator car reaches contract speed for some indefinite period time. Since the contract speed will not vary with the chosen motion profile, it is shown as a broken line of finite length to indicate that the elevator car may travel at the contract speed for varying lengths of time depending on the distance travelled between the origin floor and the destination floor.

In FIG. 2 there is indicated a portion of the curve from point A, when the elevator car is just leaving the origin floor, to point B. This portion from A to B may be a constant jerk portion wherein the rate of change of acceleration or jerk is maintained constant. Thereafter, from point B to point C there is depicted a constant acceleration portion of the profile where the elevator car continues to accelerate at a constant rate. From point C to point D there is depicted another constant jerk portion where the rate of change of acceleration is maintained constant until point D at which point the elevator has reached its contract speed or maximum velocity. The elevator travels at constant velocity for the period depicted by the line from point D to point E, point E being where the car begins to decelerate to stop at its destination floor. The portion of the graph from E to F depicts a constant jerk portion of the profile wherein the elevator car is decelerated at a constantly changing rate to point F. From point F to point G there is depicted a constant deceleration zone indicating the elevator car is decelerated at a constant rate. From point G to point H the elevator car continues to decelerate until it arrives at the destination floor. Many ways are utilized to coordinate the slowing of the elevator car as it approaches the destination floor such that the elevator car may stop within a very narrow range adjacent the floor. Typically, a feedback control of some nature is utilized to sense the exact position of the car and to effect stopping the car at the desired point.

Figure 3:
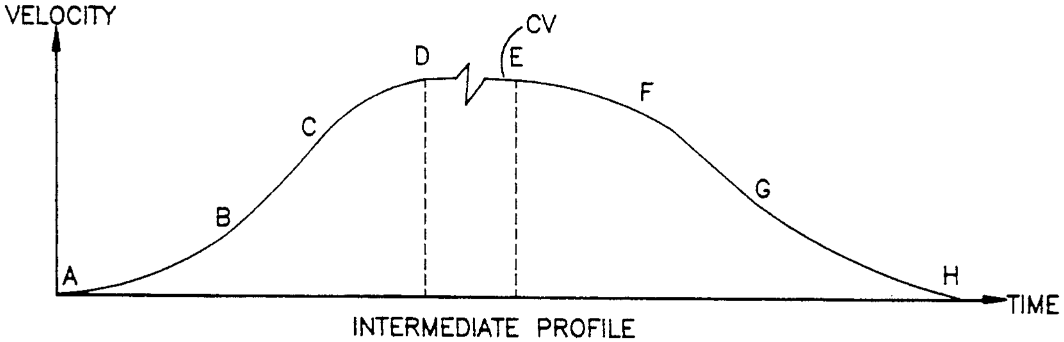
FIG. 3 is a graph of a velocity profile for the intermediate exemplary profile.

FIG. 3 is a graph of an exemplary intermediate profile having the same segments as FIG. 2. The difference between FIG. 2 and FIG. 3 is that the jerk rate, sections A–B, C–D and E–F, is less than the jerk rate in FIG. 2 and the constant acceleration of section B–C and constant deceleration of area F–G are both at reduced rates from FIG. 2. What this means is that a passenger riding in an elevator car operated in accordance with the motion profile of FIG. 3 senses a smoother, higher quality ride than if the car were operated in accordance with the profile of FIG. 2, however, it takes longer to reach contract speed and the average speed of the elevator car is reduced and, consequently, the time elapsed between the elevator doors closing at the origin floor and the elevator doors opening at the destination floor, or flight time, is increased.

Figure 4:
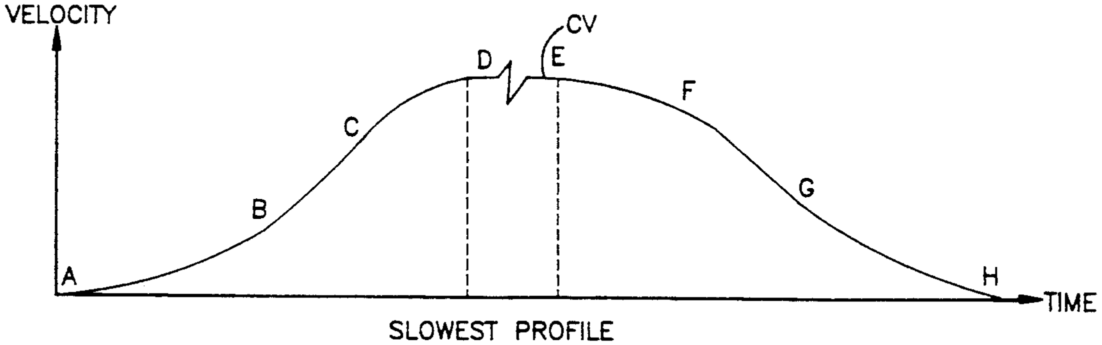
FIG. 4 is a graph of a velocity profile for the slowest exemplary profile.

FIG. 4 is a graph of an exemplary slowest velocity profile. The same segments as for the other profiles are provided, however, the jerk rate and rate of acceleration and deceleration are even more reduced than those depicted in FIG. 3, resulting in a slower, more comfortable ride. A comparison between the slope of the curves of the three graphs shows the reduction in jerk and acceleration rates and the relative positioning of the constant velocity section of each curve indicates that it takes longer to reach constant velocity and longer to decelerate from constant velocity to the destination floor using a slower velocity or motion profile. Again, the slower jerk, acceleration and deceleration rates provide an even increased sense of a smooth quality ride, however, the slower rates increase the flight time between floors. The slope of the various curves of FIGS. 2, 3 and 4 further indicates the differences in jerk and acceleration rates.

A velocity profile as shown in FIG. 2 may be an example of a profile more adapted to the North American marketplace where passengers are more willing to experience some reduced comfort in ride to achieve decreased flight times.

The FIG. 4 profile might be a profile more adapted to a Far Eastern market where passengers have become accustomed to a smoother ride and lower acceleration rates and would not object to slightly longer waiting times or reduced elevator performance.

A profile may be defined by a mathematical formula including constants. Various profiles may be generated by changing the constants used to generate the profile. The constants for different profiles may be stored in a "look up" table portion of a computer program and thereafter selected to generate an appropriate profile as are depicted between FIGS. 2, 3 and 4.

Figure 5:
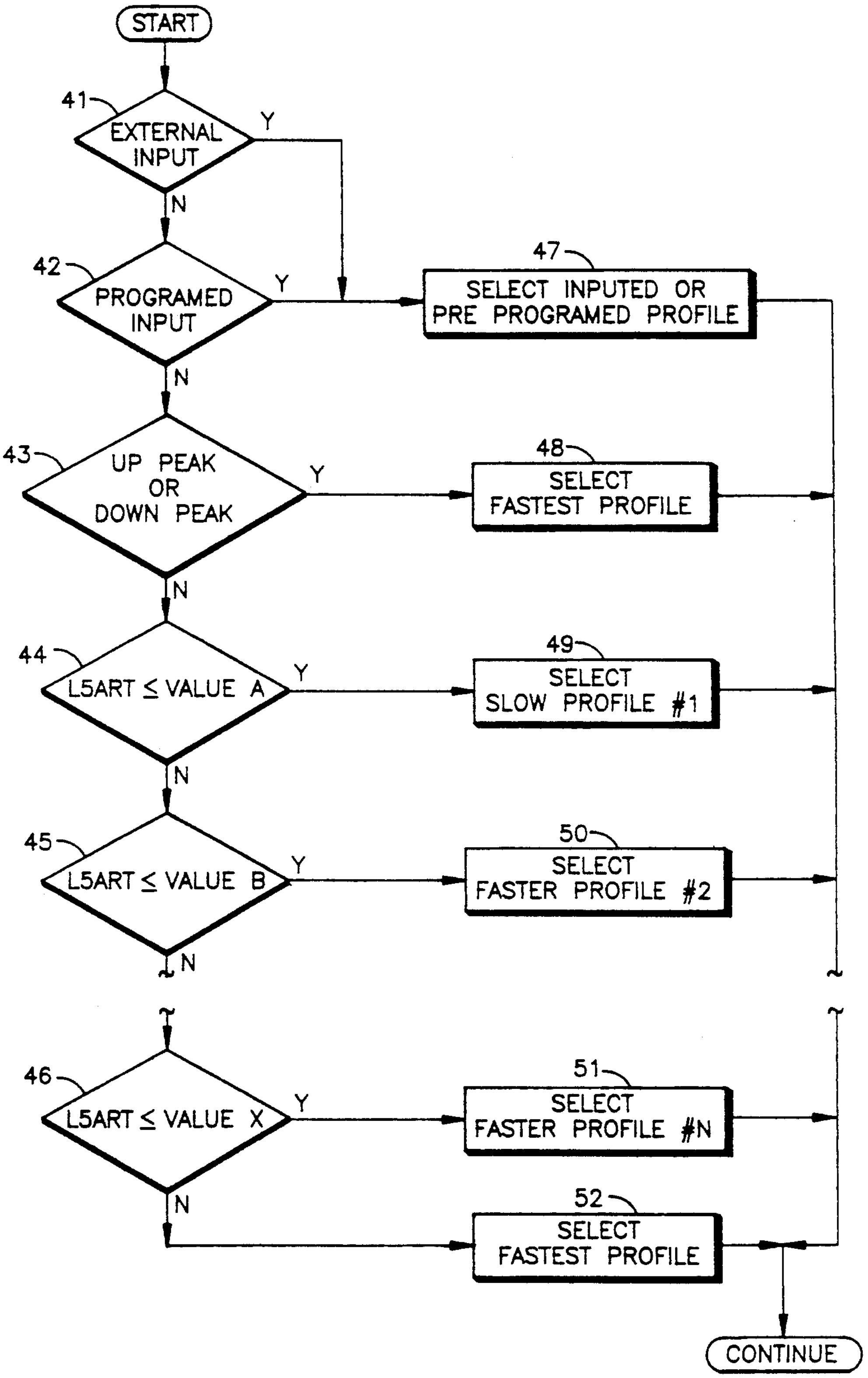
FIG. 5 is a flowchart depicting the logic involved in the selection between velocity profiles.

FIG. 5 is a flowchart depicting a portion of a program which may select which profile should be used. Beginning at the top of the flowchart in the start position, the logic flows to step 41 wherein the question is asked whether or not there is an external input, such as, a keyboard, a key switch or some other manually operated device which is overriding the logic and indicating that a specific preprogrammed profile should be selected based upon that override. If the answer to logic question 41 is "Yes", the logic flows to block 47 where the preprogrammed profile is selected. If the answer to logic question 41 is "No", logic flows to block 42 and asks the question whether or not there is a programmed input based on time of day. If the answer is "Yes", the logic flow is to block 47 and the preprogrammed profile for that time of day is selected. If the answer to logic question 42 is "No", the logic flows to block 43 wherein it is determined whether or not an elevator system is in an up-peak or down-peak period. If the answer to whether or not an elevator system is in an up-peak or down-peak period is "Yes", then the fastest profile is selected in block 48 and the elevator system operates at peak capacity. If the answer to logic question 43 is "No", the logic flows on to block 44.

In block 44 a logic question asks whether or not the last five minutes average registration time in seconds is less than or equal to a preselected value A. If the answer to logic question 44 is "Yes", the logic flow is to block 49 and profile #1, a relatively slow profile providing high ride quality, is selected. If the answer to logic question 44 is "No", the logic flow is to block 45 and the same question is asked with a slightly higher value B indicative of an increased demand for elevator service. If the answer to the question whether the last five minutes average registration time is less than or equal to the value B is "Yes", then the logic flows to block 50 and a faster profile is selected.

If the answer to logic question in block 45 is "No", the logic flows to block 46 where the logic question whether the last five minutes average registration time in seconds is less than or equal to value X is asked. If the answer is "Yes", then the logic flows to block 51 and a faster profile #N is selected. Profile #N and value X in blocks 46 and 51 are selected to indicate that there may be any one of a series of profiles generated and it is the appropriate profile in this series that is selected to meet the elevator service demand while providing the appropriate level and providing the most comfortable ride.

If the answer to the logic question in block 46 is "No", the logic flow is to block 52 and the fastest motion profile is selected providing for maximum elevator service.

The above invention has been described with reference to a particular embodiment. It is understood by those skilled in the art that variations and modifications can be effected within the spirit and scope of the invention. The utilization of hardwired electrical components in lieu of a preprogrammed microprocessor is within the intent of the invention although the preferred embodiment implements these features with a programmed microprocessor.

We claim:

1. A method of operating an elevator system to provide variable speed car travel to service variable intensity traffic in a building, comprising:

determining, in each one of a plurality of successive relatively short time intervals, an indication of traffic intensity in the building;

providing a plurality of predetermined criteria for determining the level of traffic intensity indicated by said indication;

providing a plurality of car motion profiles, including a sequence of at least three profiles extending from the slowest profile in said plurality of profiles to the fastest profile in said plurality of profiles, each of said criteria corresponding to one of said profiles in said sequence with the slowest speed one of said sequence of profiles corresponding to the one of said criteria indicating the lowest intensity traffic;

a) in response to the presence of an indication of a peak traffic period, providing a first profile which is the fastest profile of said plurality of profiles;

b) in response to the absence of said indication of a peak traffic period, providing either the one of said profiles corresponding to the one of said criteria of which said indication of traffic intensity of the next preceding one of said intervals is equal to or less than, or said highest speed profile if said indication of traffic intensity exceeds all of said criteria; and dispatching an elevator car to service a call utilizing the provided one of said profiles to control the motion of said car.

2. A method according to claim 1 wherein said indication of traffic intensity is the average amount of time during said interval that hall calls registered in said interval remained outstanding.

3. A method according to claim 1 comprising:

providing a number of specific profiles each corresponding to one of a number of related discrete indications;

in response to the presence of any one of said discrete indications, providing a selected one of said specific profiles corresponding to said discrete indication; and wherein said steps a) and b) are performed only in the absence of said discrete indications.

* * * * *